(12) United States Patent  (10) Patent No.: US 8,087,646 B2
Kirchner et al.  (45) Date of Patent:  Jan. 3, 2012

(54) HYDROPNEUMATIC SUSPENSION WITH LOAD-DEPENDENT DAMPING CONTROL

(75) Inventors: Holger Kirchner, Ruppichteroth (DE); Norbert Ackermann, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1002 days.

(21) Appl. No.: 11/367,743

(22) Filed: Mar. 2, 2006

(65) Prior Publication Data

US 2006/0196740 A1  Sep. 7, 2006

(30) Foreign Application Priority Data

Mar. 5, 2005  (DE) .......................... 10 2005 010 205

(51) Int. Cl.
*F16F 5/00* (2006.01)

(52) U.S. Cl. .................. 267/64.16; 280/5.515

(58) Field of Classification Search .............. 188/322.15, 188/322.22; 267/64.16–64.17; 280/5.515
See application file for complete search history.

(56) References Cited

U.S. PATENT DOCUMENTS

| | | | | | |
|---|---|---|---|---|---|
| 2,144,583 | A | * | 1/1939 | Focht | 188/287 |
| 2,788,092 | A | * | 4/1957 | Whisler, Jr. | 188/320 |
| 3,677,561 | A | * | 7/1972 | McNally | 280/124.157 |
| 3,807,753 | A | * | 4/1974 | Ito et al. | 280/6.158 |
| 4,460,073 | A | * | 7/1984 | Smeltzer | 188/322.13 |
| 4,655,440 | A | * | 4/1987 | Eckert | 267/64.11 |
| 4,786,034 | A | * | 11/1988 | Heess et al. | 267/64.15 |
| 4,963,423 | A | * | 10/1990 | Sekiguchi et al. | 428/209 |
| 5,054,808 | A | * | 10/1991 | Tsukamoto | 280/5.5 |
| 5,062,616 | A | * | 11/1991 | Sommer | 267/64.17 |
| 5,222,759 | A | * | 6/1993 | Wanner et al. | 280/5.515 |
| 5,477,947 | A | * | 12/1995 | Schalles et al. | 188/298 |
| 5,865,453 | A | * | 2/1999 | Harada et al. | 280/124.161 |
| 6,032,933 | A | * | 3/2000 | Beck | 267/64.17 |

FOREIGN PATENT DOCUMENTS

DE  36 01 445  7/1987

\* cited by examiner

*Primary Examiner* — Christopher Schwartz
(74) *Attorney, Agent, or Firm* — Cozen O'Connor

(57) ABSTRACT

A piston-cylinder unit for installing between a vehicle body and an axle includes a cylinder filled with damping medium, a piston dividing the cylinder into working spaces, and a piston rod. A first damping valve assembly in the piston damps movement of the piston in tension and in compression. A load dependent valve includes a valve body which can be moved axially by pressure in the damping medium, the valve body having axially opposed first and second actuation surfaces. The first actuation surface is exposed to pressure of a first accumulator, which is connected to one of the working spaces, and the second actuation surface is exposed to pressure of a second accumulator.

12 Claims, 4 Drawing Sheets

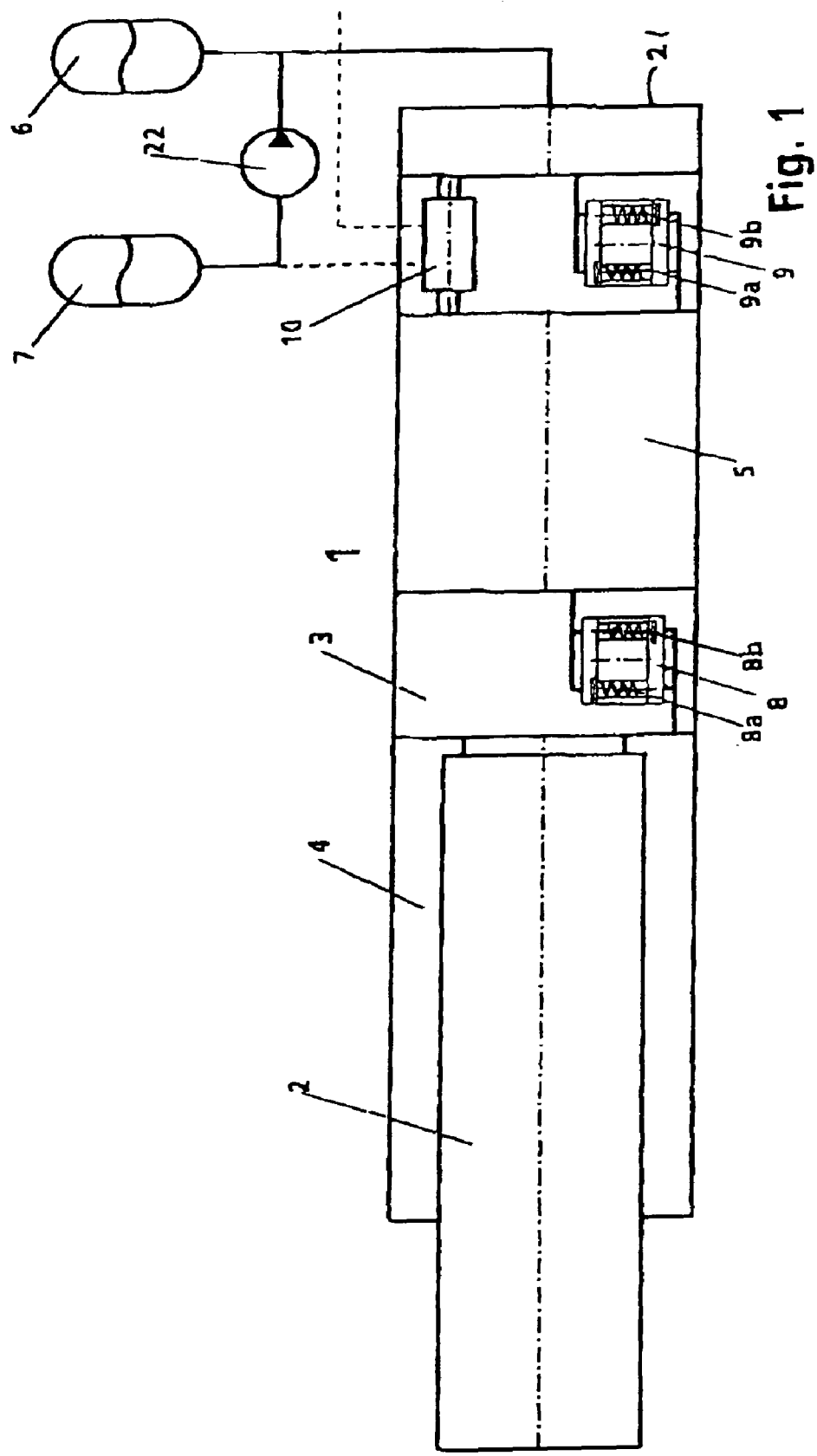

HYDROPNEUMATIC SUSPENSION WITH LOAD-DEPENDENT DAMPING CONTROL

BACKGROUND OF THE INVENTION

1. Field of the Invention

The invention pertains to a hydropneumatic suspension with load-dependent damping control for vehicles, with at least one piston-cylinder unit, located in the area of the vehicle wheel between the vehicle body and the vehicle axle, this unit being connected to at least one pressure accumulator by at least one hydraulic line, where the piston-cylinder unit is provided with a first damping valve assembly for tension and compression damping.

2. Description of the Related Art

Hydropneumatic suspensions with load-dependent damping control for vehicles in which at least two telescoping spring cylinders are mounted in the area of the vehicle wheels between the body of the vehicle and the wheel axle are already known (DE 36 01 445 C2). These telescoping spring cylinders are connected to a pressure accumulator by a pressure medium line, and a damping piston in the working cylinder of the telescoping spring cylinder is provided with damping valves for tension and compression damping. An additional damping valve is mounted in the pressure medium line in a separate component. The valve body of this additional valve is installed such a way that the pressure medium can push it axially in one direction and atmospheric pressure can push it in the other, as a result of which an additional load-dependent (pressure-dependent) damping force is produced. The disadvantage here is that the adjusting device is subjected to a load equal to the system pressure even under base load conditions, that is, even before any extra weight has been added to the vehicle, This pressure must be sealed off against the atmosphere. When extra weight is added, the system pressure usually increases by a factor of approximately 3:1. A certain percentage of this increase provides the force which acts to produce the adjustment.

SUMMARY OF THE INVENTION

An object of the invention is to design a hydropneumatic suspension in such a way that it is possible to obtain, easily and at low cost, an independent increase in vehicle damping as a function of pressure when load is added and a reduction in the damping when the vehicle is unloaded, so that both driving comfort and driving safety are improved.

According to the invention, the piston-cylinder unit has a second damping valve assembly and a valve controlled as a function of load, the valve body of which can be moved axially back and forth by the pressure of the damping medium, which acts on both ends of the valve body.

It is especially advantageous in this design for the load-dependent valve to have surfaces upon which the system pressure (of a first accumulator) can act. The valve also has working surfaces upon which the pressure of a second accumulator acts. This produces the advantageous result that the force which acts on the valve at base load is eliminated, because the pressures in the two accumulators can be kept equal. It is especially advantageous that a seal against the atmosphere can be eliminated.

It is also advantageous that, as the system pressure (the pressure in the first accumulator) increases, the force acting on the load-dependent valve increases also. At the same time, as the pressure in the first accumulator increases, the pressure in the second accumulator, which acts on the load-dependent valve in the opposite direction, decreases. As a result, the load-dependent increase in the resulting adjusting force is reinforced.

According to another favorable embodiment, the load-dependent valve is located between the two working spaces of the piston-cylinder unit.

In one embodiment of the invention, the load-dependent damping valve can be installed in the bypass leading to the first damping valve, and in another embodiment the load-dependent valve can be installed in the bypass leading to the second damping valve.

According to another embodiment, the second damping valve and the load-dependent valve can be provided in a connection between the piston-cylinder unit and the accumulator.

According to another embodiment, the valve body is mounted in a bore, and the pressure of the damping medium acts on both of its end surfaces.

According to another favorable embodiment, at least one end surface of the valve body is actuated by at least one spring. It is advantageous here for the valve body to have a cone, which cooperates with a bore, where the pressure from one direction acts on one part of the cone, and the pressure from the other direction acts on another part of the cone. Alternatively, the pressures from two directions act on the cone, and the end surface of the valve body opposite the cone is supported by a spring against the valve housing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 shows a schematic diagram of a hydropneumatic suspension with load-dependent damping control;

DETAILED DESCRIPTION OF THE PRESENTLY PREFERRED EMBODIMENTS

Figure 1A:
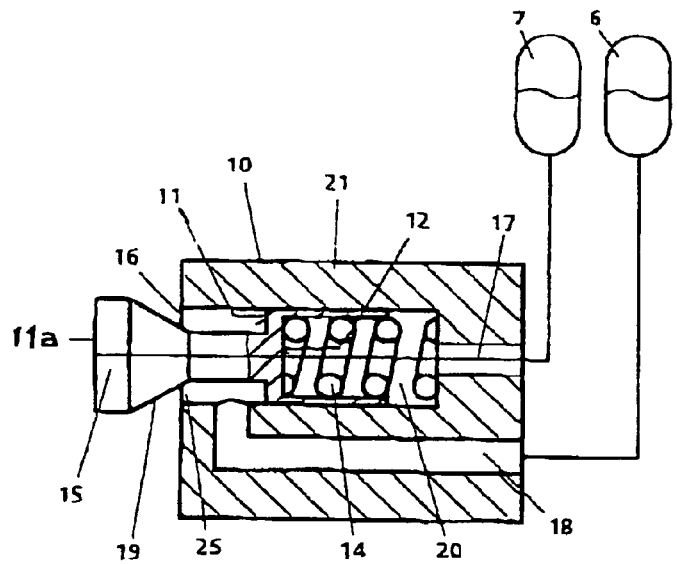
FIGS. 1a, 1b, and 1c show cross sections of an additional embodiment of a damping valve controlled as a function of load.

The hydropneumatic vibration damper shown in FIG. 1 with load-dependent damping control includes a cylinder 1, a piston rod 2, and a working piston 3, connected to the piston rod 2, this piston dividing the cylinder 1 into an upper working space 4 and a lower working space 5. The working piston 3 is provided with a first damping valve assembly 8, which has at least one damping valve 8a for the tension stage and at least one other damping valve 8b for the compression stage. The damping valve assembly 8 is illustrated in schematic fashion.

Proceeding from the lower working space 5, a second damping valve assembly 9 is provided at the bottom of the piston-cylinder 1. This valve assembly also has individual damping valves 9a and 9b for the tension and compression directions Connected in parallel to the valve assembly 9 is a valve 10, which operates in a load-dependent manner. The details of this valve are shown in FIGS. 1a-1c and 3a-3b. A pressure accumulator 6 is connected to balancing space 21, which in turn is connected to the lower working space 5 via the valve assembly 9 and the load-dependent valve 10, and an additional pressure accumulator 7 is provided, which can be actuated by a pump 22. When load is added to the vehicle and thus the pressure in the accumulator 6 increases, the load-dependent damping valve 10 acts in such a way that the damping force is increased.

Figure 2:
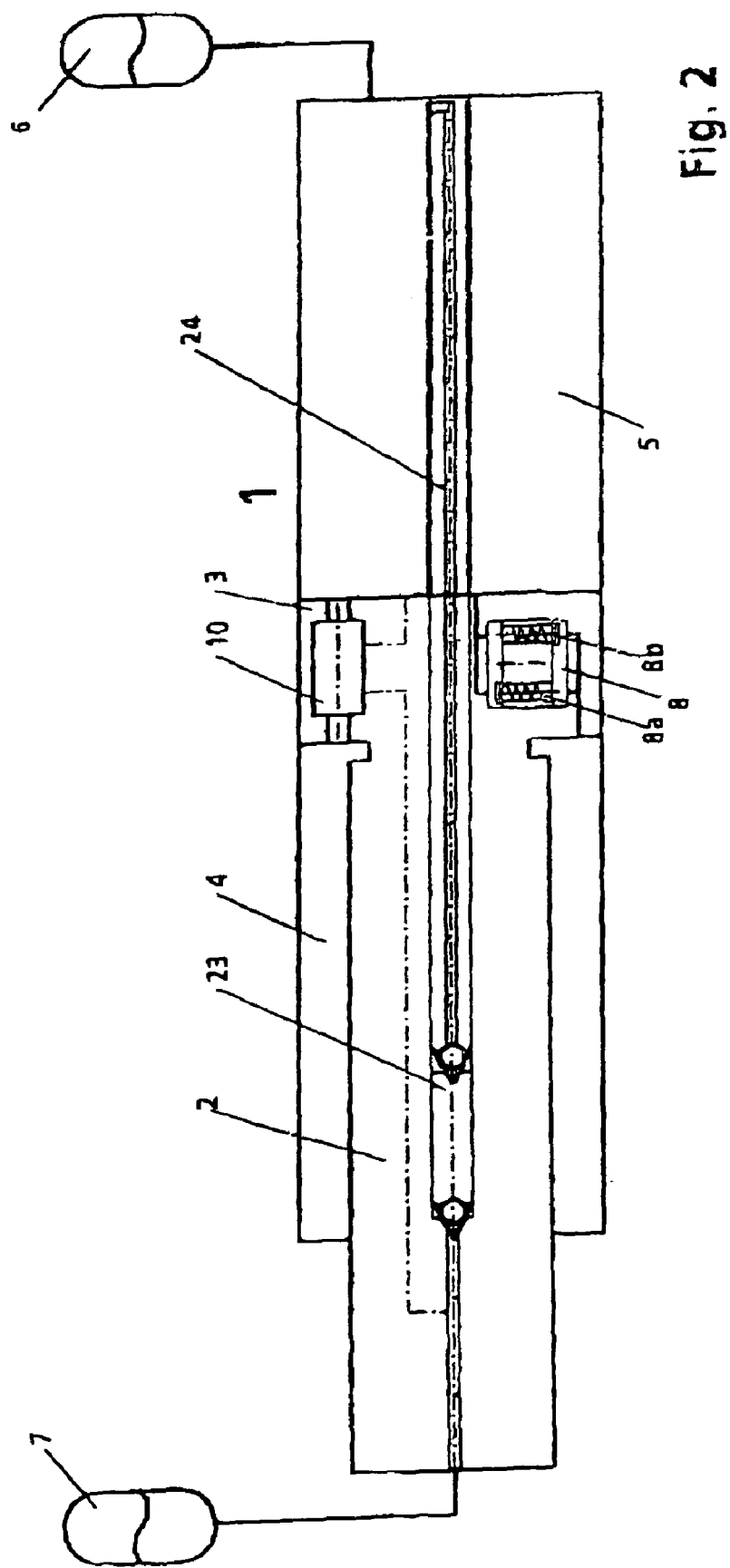
FIG. 2 shows a schematic diagram of a hydropneumatic suspension with a self-pumping, level-controlling spring strut.

FIG. 2 shows a self-pumping hydropneumatic spring strut with internal level control, which again consists of the piston-cylinder unit 1, the piston rod 2, and the working piston 3. The working piston 3 is provided with a damping valve assembly 8, the individual valves 8a and 8b of which act in the compression and tension directions, respectively. A load-dependent damping valve 10, connected in parallel with the damping valve assembly 8, is also mounted in the working piston 3. This valve increases the damping forces when the pressure in the piston-cylinder unit increases. The piston-cylinder unit 1 according to FIG. 2 is designed as a self-pumping hydropneumatic spring strut with internal level control, and for this purpose a pump rod 24 travels back and forth in the hollow space 23 inside the piston rod 2, so that, upon relative movement of the piston rod 2 and the pump rod 24, damping medium is conveyed from the hollow space 23 to the pressure accumulator 6. The actual level control of this piston-cylinder 1 is not shown in detail. The load-dependent damping valve 10 used here could have the design according to FIG. 3c, for example.

FIG. 1a shows a valve 10, controlled as a function of pressure, where the pressure from the cylinder 1 and from the pressure accumulators 6 and 7 act on the respective end surfaces 11, 12 of the valve body 15. A spring 14 is also provided, which acts on the end surface 12 of the valve body 15. The valve body 15 is mounted with freedom to move axially in a slide bore 20 in housing 21, and the corresponding flow connections 18 and 17 connect the pressure-actuated end surfaces 11, 12 to respective pressure accumulators 6 and 7. The valve body 15 is provided with a control member in the form of cone 19, so that, depending on the axial position of the body, the control bore 16 is opened to a greater or lesser extent, thus opening a channel for the damping medium, the size of the channel corresponding to the pressure in the working space 5 or in the pressure accumulator 6 or 7. The connections of valve 10 to the pressure accumulators 6, 7 is shown by dashed lines in FIG. 1. The connection of the valve 10 to the pressure accumulators 6, 7 is shown by dash-dot lines in FIG. 2.

Figure 1B:
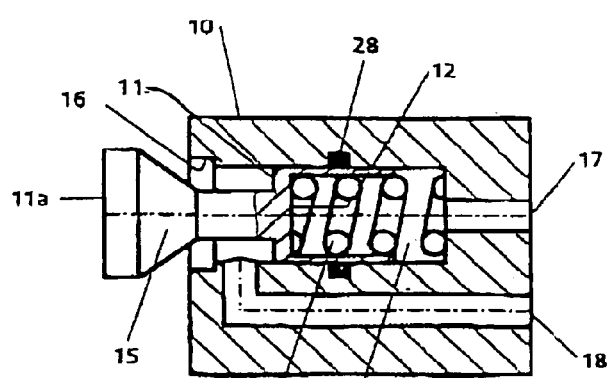
Figure 1C:
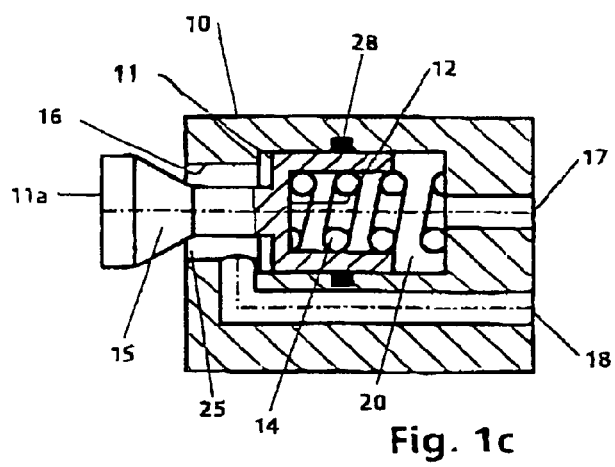

FIGS. 1b and 1c also show the valve 10, where, in these embodiments of the invention, the actuation surfaces 11 and 12 in FIG. 1c have diameters larger than those FIG. 1b. A sealing element 28 can be provided if desired. In each figure, the actuation surface 11 is acted on by the pressure in accumulator 6, and the actuation surface 12 is acted on by the pressure in accumulator 12.

Figure 3A:
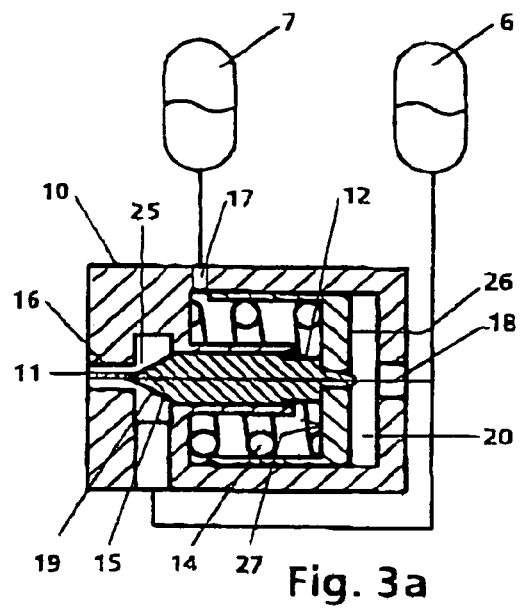
FIGS. 3a, 3b, and 3c show cross sections of additional embodiments of a damping valve controlled as a function of load.
Figure 3B:
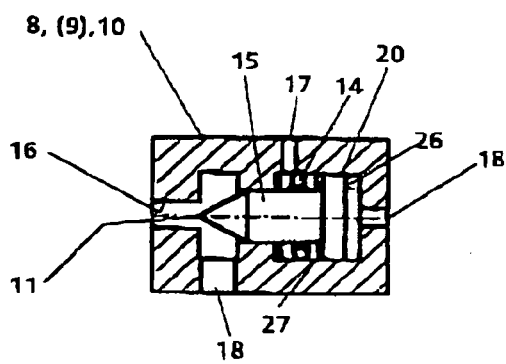

FIGS. 3a and 3b also show various embodiments of the valve 10.

FIGS. 3a and 3b show the valve 10 with a valve body 15, the position of which is determined essentially by the spring 14 and the force acting on the pressure surfaces 26 and 27. Because the end surface 11 upon which the flowing fluid acts is relatively small, the forces produced by the flow exert no influence on the opening of the valve.

Figure 3C:
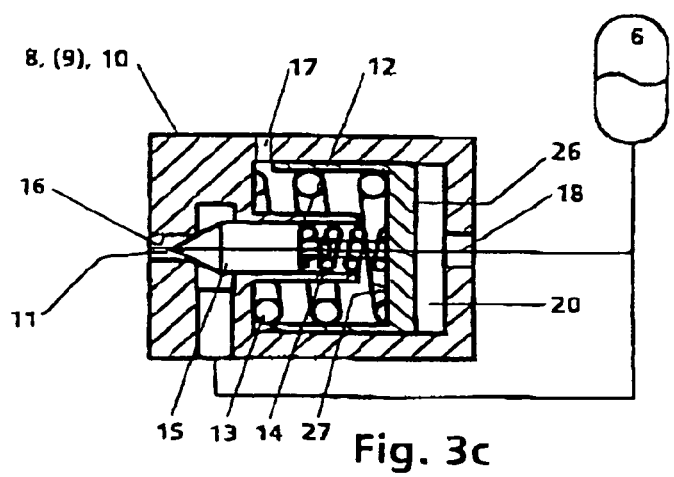

FIG. 3c shows an embodiment of the invention in which a strong spring 13 acts against the large surfaces 26 and 27, and a weaker spring 14 works against the hydraulic pressure acting on the end surface 11. The travel of the spring 13 changes the pretension of the spring 14.

Through the cooperation of the spring 14, the end surface 11, and the control bore 16, the valve element can thus act as a load-dependent damping valve without its movement causing any significant change in the pretensioning travel of the spring 13.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic suspension with load dependent damping control for a vehicle having a body and an axle, the suspension comprising:
    a piston-cylinder unit for installing between the vehicle body and the axle, the unit comprising a cylinder filled with damping medium, a piston dividing the cylinder into two working spaces, and a piston rod;
    a first damping valve assembly in said piston for damping movement of the piston in tension and in compression;
    a first pressure accumulator connected to one of said working spaces;
    a load dependent valve comprising a valve body which can be moved axially by pressure in said damping medium as a function of the load on the vehicle to change damping characteristics of the load dependent valve, said valve body having axially opposed first and second actuation surfaces, wherein said first actuation surface is exposed to the pressure of said first accumulator; and
    a second pressure accumulator connected to the one of said working spaces, wherein the second actuation surface is exposed to pressure of the second accumulator.

2. The hydropneumatic suspension of claim 1 wherein the load dependent valve comprises a valve housing having a slide bore, the valve body being received in the slide bore.

3. The hydropneumatic suspension of claim 2 wherein the load dependent valve further comprises a spring acting on one of said actuation surfaces.

4. The hydropneumatic suspension of claim 3 wherein the valve housing has a control bore connected to said slide bore, said valve body comprising a cone which is seated in said control bore.

5. The hydropneumatic suspension of claim 4 wherein the first actuation surfaces faces said cone, the second actuation surface facing away from said cone and being acted on by said spring.

6. The hydropneumatic suspension of claim 1 wherein the load dependent valve is located between one of the working spaces and the pressure accumulator.

7. The hydropneumatic suspension of claim 6 further comprising a second damping valve assembly between said one of said working spaces and said first pressure accumulator in parallel with said load dependent valve.

8. The hydropneumatic suspension of claim 1 wherein the load dependent valve is located between the two working spaces.

9. The hydropneumatic suspension of claim 8 wherein the load dependent valve is located in said piston.

10. The hydropneumatic suspension of claim 1 further comprising:
a control member which moves with said valve body, the control member being located in a flow connection, the flow connection have a cross-section which changes as the valve body moves, thereby causing the change in damping characteristics of the load dependent valve.

11. A hydrodynamic suspension with load dependent damping control for a vehicle having a body and an axle, the suspension comprising:
a piston-cylinder unit for installing between the vehicle body and the axle, the unit comprising a cylinder filled with damping medium, a piston dividing the cylinder into working spaces, and a piston rod;
a first damping valve assembly in said piston for damping movement of the piston in tension and in compression;
a first pressure accumulator connected to one of said working spaces;
a load dependent valve providing a flow connection between said one of said working spaces and one of another of said working spaces and a balancing space in said cylinder, said load dependent valve comprising a valve body which can be moved axially by pressure in said damping medium as a function of the load on the vehicle to change damping characteristics of the load dependent valve, said valve body having axially opposed first and second actuation surfaces, wherein said first actuation surface is exposed to the pressure of said first accumulator; and
a second pressure accumulator connected the one of said working spaces, the second actuation surface being exposed to pressure of said second accumulator.

12. The hydropneumatic suspension of claim 11, wherein the load dependent valve comprises a control member which moves with said valve body, the control member being located in the flow connection, the flow connection have a cross-section which changes as the valve body moves, thereby causing the change in damping characteristics of the load dependent valve.

* * * * *